Patented Sept. 4, 1951

2,566,365

UNITED STATES PATENT OFFICE 2,566,365

ORGANIC ORTHOSILICATES STABLE AGAINST HYDROLYSIS

George Wesley Pedlow, Jr., Easton, Pa., and Carl Shelley Miner, Jr., Winnetka, Ill., assignors to Minnesota Mining & Manufacturing Company, St. Paul, Minn., a corporation of Delaware No Drawing. Application June 15, 1946, Serial No. 677,098

5 Claims. (Cl. 260—448.8)

This invention relates to organic orthosilicates or silicoorthoesters, and is particularly concerned with those orthosilicates which are stable against hydrolysis and which contain from one to three tertiary carbon atoms bonded through intervening oxygen atoms to silicon.

This application is a continuation-in-part of our copending application Serial No. 470,904, filed December 31, 1942.

Organic orthosilicates may be regarded as organic derivatives of orthosilicic acid $H_4SiO_4$. Heretofore others have produced certain orthosilicates starting with silicon tetrachloride, $SiCl_4$. One such material, which is derivable from silicon tetrachloride, is ethyl orthosilicate, $(C_2H_5O)_4Si$, which may also be referred to as tetra-ethoxysilane or tetraethoxysilane, and which is a primary alkyl orthosilicate. This and various other organic orthosilicates, especially primary carbinyl orthosilicates and to a lesser extent secondary carbinyl orthosilicates, have long been known; some of them having been known before the present century. Since the filing of our parent application, much information has been collected and published in a book published (in 1943) by H. W. Post as A. C. S. Monograph No. 92, entitled "The Chemistry of Aliphatic Orthoesters," in which many such compounds and their properties are disclosed.

Various prior art orthosilicates were found to have uses due to their ability to hydrolize readily. At the same time, the application of the alkyl orthosilicates to various other uses was greatly restricted due to this same property of ease of hydrolysis. For example, the presence of moisture in various cases resulted in the formation of silica, etc., in systems containing prior art organic orthosilicates.

It has been found that such hydrolysis may be greatly diminished or even almost entirely prevented, and consequently that the formation of undesirable hydrolysis products may be inhibited, by using orthosilicates, as hereinafter illustrated, in which from one to three of the hydrogen atoms of the theoretical orthosilicic acid have been replaced by tertiary carbon atoms; and this is one of the objects of our invention. Further, more broadly, it is an object of our invention to produce compounds having many of the desirable properties of prior art orthosilicates (which are of the non-tertiary type) but having much improved resistance to hydrolysis under various conditions. A related object is the production of orthosilicates which have new utility because of their new characteristics over prior art orthosilicates. These and other objects and advantages will appear from the specification and appended claims.

Compounds of this invention, as above indicated, show an unexpected stability toward the action of water, whereas ethyl orthosilicate, for example, is susceptible to hydrolysis in contact with liquid water or even with the moisture vapor of the atmosphere, yielding silica and ethyl alcohol. However, in the novel organic-silicon compounds herein described and which contain one, two, or three groups derived from tertiary alcohols, the resulting compound is remarkably stable toward such hydrolysis. For example, a same of triethyl tert-amyl silicate was not noticeably affected after direct contact with water for a period of over four months. It also remained unchanged after 6 hours heating and rapid stirring at 90° C. with 15% aqueous ammonia.

As an additional example of the stability of our novel compounds toward hydrolysis, we have found that the substitution of tertiary-butyl or chlorinated-tertiary-butyl groups for one, two or three of the normal-butyl groups of n-butyl orthosilicates provides greatly increased stability of the molecule toward hydrolysis. The following Table 1 illustrates the high stability to hydrolysis of products of our invention as compared with n-butyl orthosilicate, $(n-BuO)_4Si$. In obtaining the tabulated data, one-tenth mol of the orthosilicate was added to 75 ml. of the aqueous acid or alkaline solution, as indicated, and the system held at 100° C. for 8 hours. During this period the mixture was kept violently agitated with a high speed stirrer so as to assure intimate contact between the orthosilicate and the aqueous solution. The unhydrolyzed portion of the orthosilicate was then recovered from the mixture by extraction and subsequent distillation. This procedure resulted in some mechanical losses, so that the recovery was not quantitative. For example, a recovery of approximately 95% indicates that substantially no hydrolysis of the orthosilicate had taken place.

The data in Table 1 show the percentage of the original ester which was actually recovered after exposure to the above-described hydrolysis conditions.

TABLE 1

*Percent recovery of orthosilicates after attempted hydrolysis*

| Orthosilicate | Sodium Hydroxide, One Normal | Hydrochloric Acid, One Normal |
|---|---|---|
| (n-BuO)$_4$Si | less than 1.5 | less than 1.5 |
| (n-BuO)$_3$Si(t-BuO) | 95.0 | 78.2 |
| (n-BuO)$_2$Si(t-BuO)$_2$ | [1] 79.1 | 91.6 |
| (n-BuO)$_3$Si(t-Cl$_2$BuO) | 95.1 | 96.0 |
| (n-BuO)$_2$Si(t-Cl$_2$BuO)$_2$ | 94.3 | 92.4 |

[1] The concentration of sodium hydroxide solution used in this experiment was five normal rather than one normal.

A sample of tri-tert-butyl n-butyl silicate was subjected to an attempted hydrolysis (under the above-described conditions) with 10.7 normal sodium hydroxide solution. After this treatment, 94.2% of the orthosilicate was recovered unchanged.

Analogous results are obtained with orthosilicates containing from one to three tertiary-carbinyl groups other than the tertiary-butyl or tertiary-dichlorobutyl groups hereinabove employed. For example, in these tertiary-carbinyl groups, such groups as alkyl, chloroalkyl, aryl, aralkyl, and/or alicyclic groups may be attached to the tertiary carbon atom, which latter is bonded through oxygen to silicon in the orthosilicate molecule.

Illustrative and advantageous procedures for preparing our organic orthosilicates containing from one to three tertiary-carbinyl groups will now be given. However, it will be understood that our novel products are contemplated irrespective of the particular method of production described.

EXAMPLE 1

Di-tertiary-butoxydichlorosilane is prepared by adding 444 parts by weight (6.0 mols) of tertiary-butyl alcohol to a mixture previously prepared by slowly adding 498 parts (6.33 mols) of pyridine to a cold (10–20° C.) solution of 510 parts (3.0 mols) of silicon tetrachloride in 1050 parts of benzene. The reaction is completed by slow heating to reflux, pyridine hydrochloride is removed by filtration, and the desired product recovered by distillation. The di-t-butoxydichlorosilane boils at 66° C. at a pressure of 11 mm. of mercury, and has a density of 1.034 grams/ml. at 20° C.

To 228 parts by weight (one mole) of di-t-butoxydichlorosilane in 500 parts of benzene is added 180 parts (2.3 mols) of pyridine and 148 parts (2 mols) of normal butyl alcohol. The reaction is completed by warming to reflux, and the product, di-t-butyl di-n-butyl silicate, i. e. di-t-butoxy-di-n-butoxysilane, is isolated by filtration followed by distillation of the filtrate.

Di-t-amyl di-n-propyl silicate, known also as di-t-amoxy-di-n-propoxysilane, may be prepared by similar technique; the product boils at 135–6° C. at 25 mm. pressure, has a density of 0.908 gram/ml. at 20° C., and a refractive index $n_D^{20} = 1.4133$.

Similarly, other orthosilicates of this invention may be prepared, by suitable selection of amounts of the proper reactants, which have one, two, or three tertiary-carbinyl groups and correspondingly three, two, or one non-tertiary-carbinyl groups in the molecule. Typical of our novel compounds are the following:

TABLE 2

| | | |
|---|---|---|
| triethyl t-amyl silicate | (t-AmO)Si(OEt)$_3$ | b. 195–205° C. |
| di-t-butyl diallyl silicate | (t-BuO)$_2$Si(OCH$_2$CH=CH$_2$)$_2$ | b. 98–108° C./11 mm. |
| di-t-amyl diallyl silicate | (t-AmO)$_2$Si(OCH$_2$CH=CH$_2$)$_2$ | b. 139° C./23 mm. |
| di-t-amyl di-n-propyl silicate | (t-AmO)$_2$Si(OPr)$_2$ | b. 135–6° C./25 mm. |
| di-t-butyl (2-methyl-2,4-pentanediol) silicate | (t-BuO)$_2$Si(O$_2$C$_6$H$_{12}$) | b. 100.5° C./15 mm. |
| di-t-butyl (2-ethyl-2-nitro-1,3-propanediol) silicate | (t-BuO)$_2$Si(O$_2$C$_5$H$_8$NO$_2$) | b. 170° C./15 mm. |
| di-t-butyl (diethyleneglycol) silicate | (t-BuO)$_2$Si(O$_2$C$_4$H$_8$O)* | gels on heating. |
| di-t-butyl (dipropyleneglycol) silicate | (t-BuO)$_2$Si(O$_2$C$_6$H$_{12}$O)* | Do. |
| di-t-butyl (tetraethyleneglycol) silicate | (t-BuO)$_2$Si(O$_2$C$_8$H$_{16}$O$_3$)* | |
| di-t-butyl (nonaethyleneglycol) silicate | (t-BuO)$_2$Si(O$_2$C$_{18}$H$_{36}$O$_8$)* | gels. |
| di-t-amyl (diethyleneglycol) silicate | (t-AmO)$_2$Si(O$_2$C$_4$H$_8$O)* | gels on heating. |
| di-t-amyl (2-methyl-2,4-pentanediol) silicate | (t-AmO)$_2$Si(O$_2$C$_6$H$_{12}$) | b. 138–45° C./29 mm. |
| dimethyl dilinaloyl silicate | (MeO)$_2$Si(OC$_{10}$H$_{17}$)$_2$ | b. 177–8° C./7 mm. |
| diethyl diterpinyl silicate | (EtO)$_2$Si(OC$_{10}$H$_{17}$)$_2$ | b. 193–209° C./6 mm. |
| bis (4-acetoxy-2-methyl-2-pentoxy) dimethoxysilane | (MeO)$_2$Si(OC$_8$H$_{15}$O$_2$)$_2$ | b. 163–6° C./5 mm. |
| bis(triphenyl methyl) dimethyl silicate | (MeO)$_2$Si[OC(C$_6$H$_5$)$_3$]$_2$* | b. 205–8° C./5 mm. |
| bis(2-methyl-2,4-pentanediol) silicate | (C$_6$H$_{12}$O$_2$)$_2$Si | b. 105–110° C./9 mm. |
| di-t-amyl diphenyl silicate | (t-AmO)$_2$Si(OC$_6$H$_5$)$_2$ | b. 145–150° C./1 mm. |
| t-amyl triphenyl silicate | (t-AmO)Si(OC$_6$H$_5$)$_3$ | b. 195–200° C./3 mm. |
| di-t-amyl bis-(2-aminobutyl) silicate | (t-AmO)$_2$Si[OCH$_2$CH(NH$_2$)C$_2$H$_5$]$_2$ | b. 160–165° C./5 mm. |

In the above list of compounds where an asterisk occurs beside the indicated formula, this has been done because we do not feel that we have sufficient evidence as yet to be sure that the formula given is necessarily the correct one. However, based on the reactants employed and on certain characteristics of the compounds obtained, the formulas given appear to be indicative of the composition of the novel products obtained.

The orthosilicates of the preceding list are each readily prepared by methods analogous to that of Example 1. The last-named compound, which contains reactive amino groups in the alcohol radical, was prepared from 2-aminobutanol and di-t-amoxy-diaminosilane. This latter compound was obtained by ammonolysis in anhydrous ammonia of di-t-amoxydichlorosilane; see our copending application Ser. No. 663,946, filed April 22, 1946, for details as to the preparation of such compounds. Where an acid acceptor for HCl or the like is required, we prefer in commercial practice to use alpha-picoline rather than pyridine, since its HCl-addition product is more easily removable from the reaction mixture. Another method applicable to the production of certain classes of orthosilicates containing tertiary-carbinyl groups and which are particularly stable toward hydrolysis under acid conditions, e. g. di-n-butyl di-t-dichlorobutyl silicate, will now be described.

EXAMPLE 2

A solution of 170 parts by weight (one mol) of silicon tetrachloride and 286 parts (two mols) of tertiary-dichlorobutyl alcohol was heated first at 55–60° C. for 3 hours, then at 98–100° C. for 6 hours. Hydrochloric acid was evolved during most of the heating. The product was distilled at reduced pressure and a fraction obtained boiling at 160–180° C./10 mm. which was found on analysis to contain 19.5% active chlorine; theory for bis(dichloro-t-butoxy) dichlorosilane is 18.5% active chlorine.

To 38.3 parts (one mol) of the fraction thus obtained was then added 15 parts (two mols) of n-butyl alcohol, and the reaction mixture heated gradually to reflux. From this mixture was recovered di-n-butyl di-t-dichlorobutyl silicate.

This preparation, or either of the steps thereof, may alternatively be carried out in the presence of an acid acceptor such as pyridine, together with a suitable diluent, as in Example 1.

In preparing our stable organic orthosilicates it is also possible to first react silicon tetrachloride with one, two, or three mols of a nontertiary alcohol or equivalent, and subsequently to complete the formation of the orthosilicate with the proper amount of a tertiary alcohol. Likewise, various combinations of alcohols or the like may be employed. For example, compounds such as n-butyl n-amyl t-butyl octadecyl silicate, n-butyl t-butyl t-amyl octadecyl silicate, and the like are contemplated.

Where, as in the above examples, a tertiary-alkoxy chlorosilane or the like is first prepared, it is important to note that in many cases purification of the tertiary-alkoxy chlorosilane is not necessary and that the orthosilicate may be made directly, often in the same reaction vessel, with the crude tertiary-alkoxy chlorosilane. To illustrate, the crude di-t-butoxydichlorosilane (which is made up of about 85% di-t-butoxydichlorosilane) may be reacted directly with allyl alcohol and pyridine to produce di-t-butyl diallyl silicate (about 73% yield), or with diethylene glycol and pyridine to produce di-t-butyl (diethylene glycol) silicate (90%) yield, etc.; the ultimate product in each case may then be purified as desired. In general, however, in making orthosilicates such as those herein illustrated, we prefer to add the appropriate alcohol or glycol, as the case may be, to a mixture of the tertiary-alkoxy chlorosilane or other t-carbinyl chlorosilicate or analogous compound in the presence of excess pyridine or other suitable acid acceptor, the reaction mixture being diluted with a suitable solvent or diluent such as benzene to provide a reaction mixture which can be readily agitated.

Di-tertiary-butoxydiacetoxysilane, di-tertiary-amoxydiacryloxysilane, di-tertiary-amoxydimethacryloxysilane, and analogous compounds may be made in generally the same manner as is indicated above except that the appropriate organic acid is employed along with the tertiary-alkoxy chlorosilane and pyridine. For example, di-tertiary-butoxydiacetoxysilane may be prepared by reacting di-tertiary-butoxydichlorosilane with acetic acid, in the presence of pyridine or other acceptor for HCl. As an alternative method, these products may be prepared by the reaction of a suitable chlorosilane with a salt of the appropriate organic acid, e. g. sodium acetate.

These various non-resinous orthosilicates, in view of their properties, may find application for numerous purposes such, for example, as plasticizers and solvents, lubricant additives, hydraulic fluids, ingredients in insecticides, etc.

A further type of compounds fairly closely related to those hereinabove discussed, and which are referred to in our parent application Ser. No. 470,904, supra, are the silicon alkyd-type resins containing tertiary-carbinyl groups attached through oxygen to silicon. These compounds have much in common with certain of the orthosilicates represented in Table 2, e. g. di-t-butyl (diethyleneglycol) silicate, etc., which may be prepared from polyhydric alcohols and polychlorosilanes. Linseed monoglyceride, prepared by reacting additional glycerine with linseed oil, is an example of a material which may be used as a polyhydric alcohol for reaction with a polychlorosilane to produce an alkyd-type resin, as in the following example.

EXAMPLE 3

To a solution of 9 parts by weight of pyridine in 20 parts of linseed monoglyceride was added 15 parts of di-t-amoxydichlorosilane over a period of 20 minutes. The temperature rose to 54° C. during the reaction. Fifty (50) parts of benzene was added and the mixture refluxed 2 hours after which it was cooled, filtered and washed three times with 50 parts of water. The benzene was then distilled off and the viscous product heated to 150° C. for one hour in an atmosphere of nitrogen. The yield of product was 22 parts by weight.

Flowouts of this product about 0.0015 inch thick on glass were baked at 150° C. for one hour. The resulting film was light yellow, hard, transparent and showed good adherence to the glass. It was about 0.001 inch thick. It showed no indication of exuding, but water caused it to blush and become frosty in appearance. However, upon drying it regained its transparency.

A similar, but somewhat softer film was prepared by using an equal amount of di-t-butoxydichlorosilane in place of the t-amyl compound in the above reaction. It was also found that the hardness of the resulting film could be appreciably increased by substituting t-butoxytrichlorosilane for part or all of the di-t-butoxydichlorosilane.

Di-t-butoxydiaminosilane was also found to react with polyhydric alcohols. For example, a mixture of linseed monoglyceride (2.0 mols), glycerine (1.0 mol), and di-t-butoxydiaminosilane (3.5 mols) was heated until the loss in weight corresponded to the elimination of 7 mols of ammonia. The product gave a film of excellent hardness and stability toward hydrolysis.

The above products resemble the familiar linseed modified polyhydric alcohol-polybasic acid alkyds and can be substituted in many instances where the latter are used. The presence of tertiary-carbinyl groups attached through oxygen to silicon, (i. e. of "tertiary-carbinoxy" groups attached to silicon), imparts to the resulting resinous orthosilicate compounds a desirable degree of resistance to hydrolysis not heretofore attained in compounds of this class.

The term "carbinyl" as used herein refers to the organic radical derived from an alcohol by removal of the hydroxyl group, and the term "tertiary-carbinyl" is similarly employed where the alcohol is a tertiary alcohol. The tertiary alcohols may contain such groups as alkyl, chloroalkyl, aryl, aralkyl, or alicyclic groups attached to the carbinol carbon. The term "tertiary-carbinoxy" as herein used is intended to cover the radical derived from any tertiary alcohol by removal of the hydrogen atom from the hydroxyl group attached to the tertiary carbon atom. Analogously, the term "carbinoxy" covers the radical derived from any alcohol by removal of the hydrogen atom from the hydroxyl (alcohol) group.

It is evident that many changes may be made in the processes as given in the above examples, e. g. in quantities of reactants, time and temperature of reaction, etc., without departing from the spirit of the invention. It will also be evident that we have been obliged to resort to specific illustrations of our novel orthosilicate products which, of necessity, must be restricted in number. However, it will also be clear in this respect that various other orthosilicates and analogous products will readily occur to those skilled in the art in the light of the illustrations and the disclosure given herein. For example, organic derivatives of $Si_2Cl_6$ or of $Si_2OCl_6$ or the like may be prepared which contain tertiary-carbinoxy groups attached to silicon in addition to non-tertiary groups. It will therefore be understood that the various illustrations given herein are exemplary only of the broader and more comprehensive phases of this invention and are not to be regarded as limitative. All embodiments within the scope of this disclosure and/or of the appended claims, which distinguish over the prior art, are contemplated.

What we claim is:
1. An orthosilicate having the formula

$$(RO)_xSi(OR')_{4-x}$$

in which R represents any monovalent tertiary carbinyl group and in which R' represents any monovalent non-tertiary carbinyl group, and $x$ is 1 to 3.

2. An orthosilicate having the formula $(RO)_3SiOR'$ in which R represents any monovalent tertiary carbinyl radical and in which R' represents any non-tertiary carbinyl group.

3. An orthosilicate having the formula $(RO)_2Si(OR')_2$ in which R represents any monovalent tertiary carbinyl group and in which R' represents any monovalent non-tertiary carbinyl group.

4. An orthosilicate having the formula $(t-AmO)_2Si(OR')_2$ in which R' represents any monovalent non-tertiary carbinyl group.

5. An orthosilicate having the formula $(t-BuO)_2Si(OR')_2$ in which R' represents any monovalent non-tertiary carbinyl group.

GEORGE WESLEY PEDLOW, Jr.
CARL SHELLEY MINER, Jr.

REFERENCES CITED

The following references are of record in the file of this patent:

UNITED STATES PATENTS

| Number | Name | Date |
|---|---|---|
| 2,048,799 | Lawson | July 28, 1936 |
| 2,053,474 | Graves | Sept. 8, 1936 |
| 2,150,507 | Kropa | Mar. 14, 1939 |
| 2,375,007 | Larsen | May 1, 1945 |
| 2,394,642 | Strain | Feb. 12, 1946 |
| 2,405,988 | Barry | Aug. 20, 1946 |
| 2,438,520 | Robie | Mar. 30, 1948 |

FOREIGN PATENTS

| Number | Country | Date |
|---|---|---|
| 625,077 | Germany | June 16, 1931 |
| 641,075 | Germany | Sept. 9, 1931 |

OTHER REFERENCES

Feiser, "Organic Chemistry," Heath & Co., publishers (1944), page 32.

"Science News Letter," March 22, 1947, page 188.